(12) United States Patent
Steele, Jr.

(10) Patent No.: US 6,255,964 B1
(45) Date of Patent: Jul. 3, 2001

(54) UNIVERSAL AIRCRAFT PANEL WITH A DYNAMICALLY SYMMETRICAL SERIES OF DISPLAYS FOR THE DIRECTIONAL AND RATE FLIGHT INSTRUMENTS

(76) Inventor: Gordon H. Steele, Jr., The Barn, Spring, Farm Melton, Woodbridge, Suffolk (GB), 1P12 1NH ( * ) Notice: Subject to any disclaimer, the term of this patent is extended or adjusted under 35 U.S.C. 154(b) by 0 days.

(21) Appl. No.: 09/428,452

(22) Filed: Oct. 28, 1999

(51) Int. Cl.[7] .................................................. G08B 21/00
(52) U.S. Cl. ......................... 340/945; 340/971; 340/975
(58) Field of Search .................................. 340/945, 971, 340/973, 974, 975; 701/14

(56) References Cited

U.S. PATENT DOCUMENTS

| | | | |
|---|---|---|---|
| 4,673,356 | * | 6/1987 | Schmidt ................................. 434/35 |
| 5,134,394 | * | 7/1992 | Beadle ................................. 340/975 |
| 5,668,542 | * | 9/1997 | Wright ................................. 340/971 |
| 5,808,563 | * | 9/1998 | Ching et al. ......................... 340/971 |

* cited by examiner

Primary Examiner—Daniel J. Wu
Assistant Examiner—John Tweel, Jr.
(74) Attorney, Agent, or Firm—Low and Low

(57) ABSTRACT

An integrated and dynamic symmetrical display of flight instruments for universal use in aircraft, wherein key instruments indicating with respect to aircraft direction are specifically arrayed with respect to key instruments indicating aircraft rate, wherein flight under instrument flight rules may be more easily learned, undertaken, and practiced with greater safety and ease of pilot workload, as compared with asymmetrical and random conventional flight instrument displays. Specifically, directional instruments are positioned in an aligned row above similarly arranged aircraft rate instruments for quick, reliable pilot scan and information utilization.

12 Claims, 2 Drawing Sheets

FIG. 1
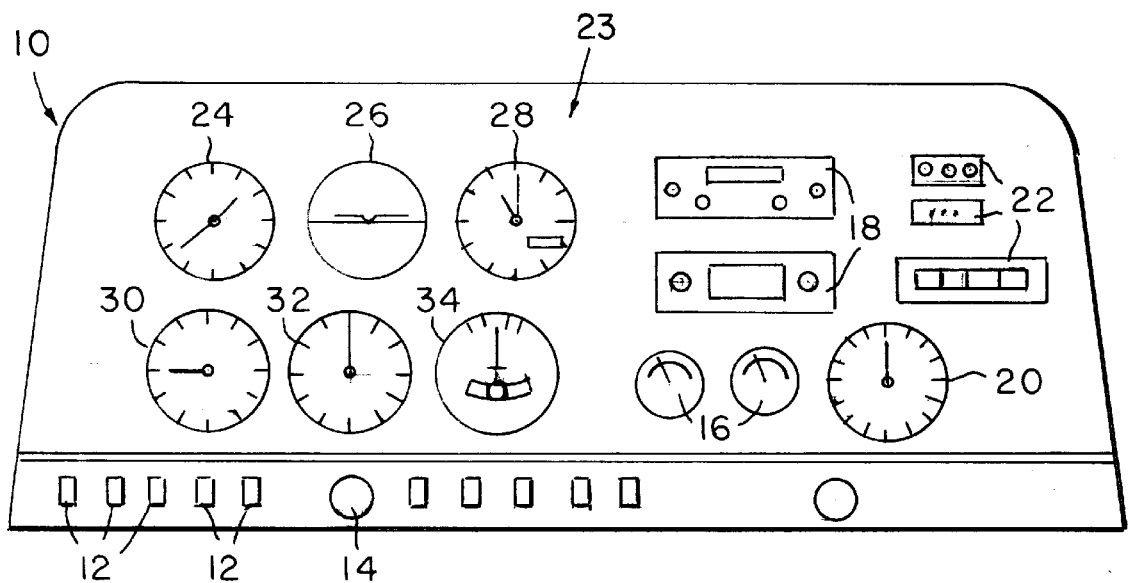
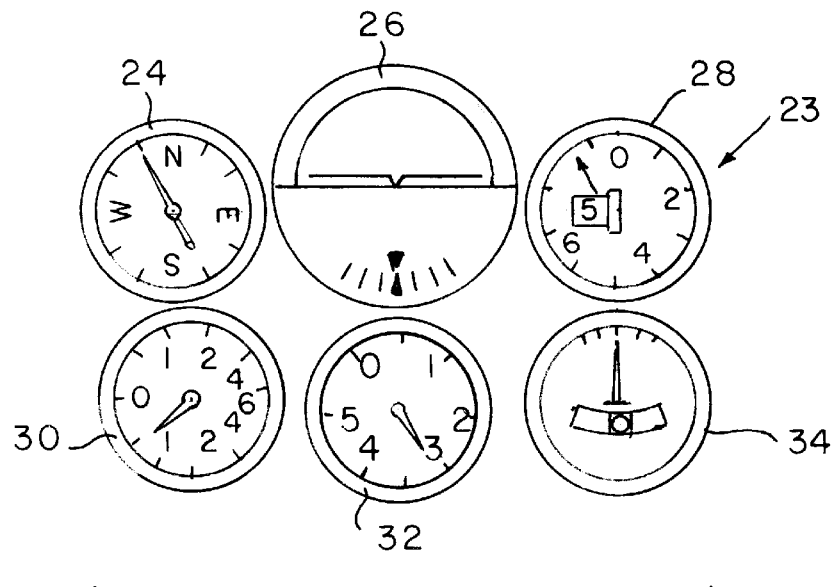
FIG. 2

UNIVERSAL AIRCRAFT PANEL WITH A DYNAMICALLY SYMMETRICAL SERIES OF DISPLAYS FOR THE DIRECTIONAL AND RATE FLIGHT INSTRUMENTS

BACKGROUND OF THE INVENTION

Throughout the long evolution of aircraft, both light single and twin engine as well as larger commercial and corporate aircraft, there has been no standardization of the multiple flight instrument gauge and indicator display on the aircraft instrument panel. Rather, the placement and arrangement of instruments thereon has always been a matter of available space, convenience, or the aircraft designer's particular preference.

As an elemental matter of continuous experience to every beginning and skilled pilot, transition from one aircraft to another invariably requires restudy and relearning of the location on the panel of the primary and necessary flight instruments before undertaking flight. The position of the instruments has varied from manufacturer to manufacturer as well as in model to model from the same manufacturer over the years.

All panel-mounted indicators and devices are intended to be placed to be viewable by and accessible to the pilot or pilots in handling and utilizing the aircraft. These include fuel gauges, fuel pumps, tachometer, clock, diverse switches for numerous functions as lights, flaps, etc., as well as communication equipment, and vary in location as deemed advisable in arranging the panel area at initial factory assembly or later rework or modification.

There are, however, of the many instruments available, six which are critical to safe handling of the aircraft in flight, especially under weather conditions inimical to visual flight (VFR) as the dark of night, haze, mist, scattered clouds, or undercast, or in any instrument meteorological conditions (IMC) requiring flight by instrument flight rules (IFR) solely by reference to panel instruments without visual assistance from outside the cockpit.

These six instruments comprise the:

(1) Altimeter
(2) Artificial Horizon
(3) Compass
(4) Vertical Speed Indicator
(5) Airspeed Indicator
(6) Turn and Bank Indicator Ever since the development by Sperry of the gyroscopic artificial horizon more than sixty years ago, substantial development and training effort has been applied to teaching and learning to safely control an aircraft and its flight by reference to these instruments, either as a sole source of flight information, or as an adjunct to limited visual flight ability. Such training has made possible safe takeoffs, flights, and landings for pilots and passengers in less than desirable weather conditions, even in the absence of radio communications.

Even so, as above indicated, the irregular, and non-standardized placement of necessary flight instruments on the panel in any aircraft and between one aircraft and another has handicapped training and learning of the techniques of flying by sole reference to instruments. Instrument flying is demanding, and the random disposition of instruments on the panels of differing aircraft has led to countless recorded instances of loss of control of aircraft under difficult flying conditions by the inability of the pilot to quickly observe, assimilate, and use indicated and accurate information from related but irregularly spaced and positioned directional and rate instruments, frequently resulting in injury and death.

Notwithstanding modern and superb navigational instruments, including radar, global positioning systems, as well as omnirange navigation, ILS and other preplanned terminal area approaches and navigation aids, etc., failure of the pilot to keep the aircraft upright or in a controlled bank, or at a proper altitude, and with an airspeed maintained above stall, by insufficiently rapid scan and perception of instrument panel information available remains a primary cause of accidents.

Efforts have been made in the past to improve the panel format of flight instruments in an attempt to improve the ability of pilots to scan and use the information provided by diverse flight instruments. See, for example, the U.S. Pat. No. 1,836,881, Henderson U.S. Pat. No. 1,924,037, Schulz U.S. Pat. No. 2,398,724, and Gordon U.S. Pat. No. 2,660,977. These patents teach varying grouped arrangements of instruments in a manner seeking to improve the scan of the pilot for quick grasping of the conveyed instrument information, thereby to enhance aircraft control and safety. These prior patents contemplate circular or cruciform arrangements of selected instruments generally representing the vertical and horizontal axes of the aircraft, for example, but do not cooperatively and symmetrically relate the functions and panel positions of each instrument to each other during cross-checking of the same by the pilot.

None of these patents, any more than the present instrument panels extant in aircraft in use today, disclose or suggest the concept of a specifically integrated and symmetrical array of known flight instruments providing unique respective and related aircraft directional and rate information before the pilot's eyes in a proximate, adjacent and symmetrical grouping for reliable and quick assimilation of the related flight indications.

BRIEF SUMMARY OF TEE INVENTION

The unique concept and practice of this invention derives from my extensive observation and instrument flying experience wherein I have determined that a novel proximate, and especially, symmetrical array of the six earlier noted key flight instruments affords ready and rapid visual determination of flight parameters from the instruments, whereby the pilot may be and remain in control and command of the aircraft notwithstanding adverse flying situations, as IFR conditions, storms, or turbulence, as well as communication demands, for example.

Specifically, it is critical to observe that three of these principal instruments provide aircraft directional information to the pilot, while the remaining three provide aircraft rate information. By appropriate symmetrical grouping or clustering of the same, the pilot is enabled to quickly grasp and relate flight data therefrom, without searching a randomly arranged instrument panel in an uncoordinated and asymmetric visual scan for the indicators providing the needed information. To this end, the invention herein embraces the concept of providing the principal flight instruments in two grouped, proximate, and specific arrays on the panel. There is, accordingly, a first array of three instruments in generally adjacent relation providing primary aircraft directional information to the pilot, and a second array of three instruments also in generally adjacent relation providing rate (or motion) information to the pilot. Further, the two instrument cluster groups are proximate each other, whereby the pilot can quickly perceive and react to related control information from adjacent instruments of each group.

By thereby providing a pair of symmetric clusters, whether circular, rectilinear, or in other geometric pattern, comprising one cluster of instruments specifically chosen and grouped to provide directional information, and a second cluster of different instruments providing rate information, a unique and hitherto unrealized cooperative relationship is provided to the pilot for ease of interpretation and use. Thus, irrespective of the non-standard placement on or around the instrument panel of other useful and necessary devices, as numerous switches, clock, carburetor heat control, etc., the unique system of the invention, when so similarly arranged in many different aircraft, permits pilots in piloting such differing aircraft to be at ease and comfortable in controlling the aircraft by reference to principal blind and visual flight instruments, without the need to mentally study and try to readjust one's instrument scan for the diverse locations of necessary indicators in each different aircraft flown.

Such arrangement of these conventional flight instruments has been hitherto unrecognized in the art or in actual aircraft available on the market.

BRIEF DESCRIPTION OF THE DRAWINGS

The invention will be better understood by reference to the accompanying drawings, in which:

FIG. 1 is a generally diagrammatic representation of an aircraft instrument panel, especially as may be found in light aircraft;

FIG. 2 is a grouping of instruments in accordance with the invention;

DESCRIPTION OF THE PREFERRED EMBODIMENT

Figure 3:
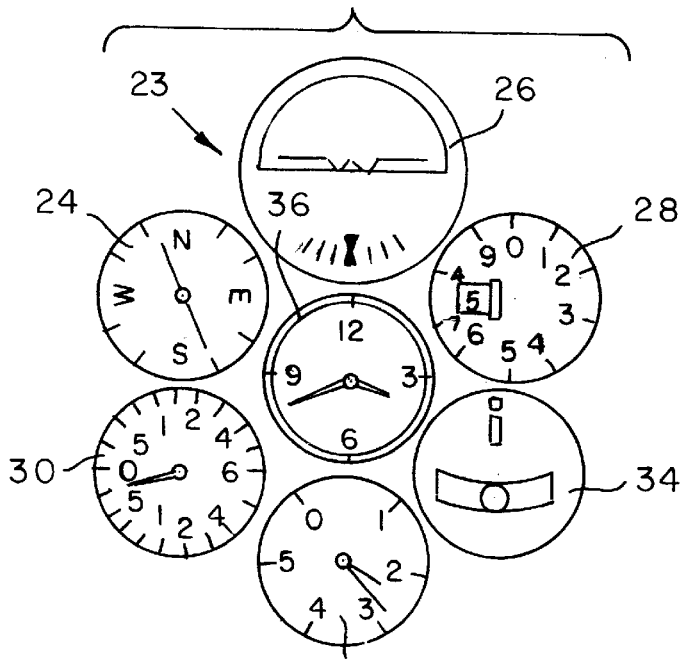
FIG. 3 is a modified grouping of instruments in accordance with the invention.

With reference to the drawings, FIG. 1 provides a generally diagrammatic representation of an aircraft instrument panel 10 and wherein customarily the pilot is seated on the left side of the cockpit facing the panel. The panel 10 mounts diverse instrumentation and equipment, including illustratively a plurality of switches and like controls 12 on either side of the tubular support 14 for a control yoke, not shown, which tubular support extends from the lower panel area toward the pilot.

The panel routinely and illustratively may further include devices as fuel gauges 16, communication equipment 18, a tachometer 20, and diverse other indicators and controls as at 22 and as may be desired to be placed in the aircraft, all as is well known and conventional in aircraft manufacture and instrumentation.

As above noted, the invention herein lies in the discovery and realization that specific selection and symmetric placement of direction and rate instruments on the panel before the pilot to facilitate interpretation and use under practice hood or actual IFR flying conditions, as well as in visual flying.

To this end, irrespective of other instruments and indicators that may be available to the pilot, the invention embraces the provision of six specific instruments at the area 23 on the left-hand portion of the panel 10, but may be (or also at) the right-hand portion of panel 10 for full dual operation or for right seat flying. In the preferred embodiment, the six instruments are in a generally rectangular, two-row array.

The first group of instruments in the top row comprises three instruments conveying directional information to the pilot, namely, Compass 24 (C), often a gyroscopic compass, but which may be any other compass, such as a radio navigation direction-seeking compass;

Artificial Horizon 26 (AH), usually including a representation of the wings of an aircraft superimposed on a horizon line; and, Altimeter 28 (ALT), including the usual Kollsman window adjustment for barometric pressure.

The second group of three instruments which convey rate information are disposed in the lower row directly beneath the upper instruments. The same comprise:

Rate of Climb/Descent or Vertical Speed Indicator (VSI) 30;

Airspeed Indicator (ASI) 32; and,

Turn and Bank (T&B) or Needle and Ball Indicator 34.

These instruments, in the specific positions shown, cooperate in a unique manner in serving the pilot. Firstly, and perhaps obviously, the information each individual instrument conveys is distinct and different from each of the other five instruments of the two-row array.

Secondly, in use with the four usual and normal desired flying modes of the aircraft, and as to be learned and practiced by the pilot, the novel instrument array provides dynamic unique symmetrical patterns easily remembered and quickly assimilated by the pilot in scanning and cross-checking the instruments.

Figure 4:
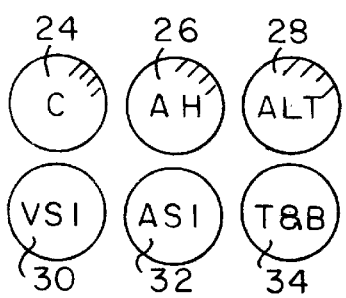
FIGS. 4–7 are respective diagrammatic showings of the instrument grouping of the invention indicating the relationship between selected instruments of the groups during in-flight scans for flight and control information; and, FIGS. 8 and 9 are respective diagrammatic showings of pertinent portions of illustrative and representative instrument panels in actual use, as typically found, and lacking the instant inventive concept.
Figure 5:
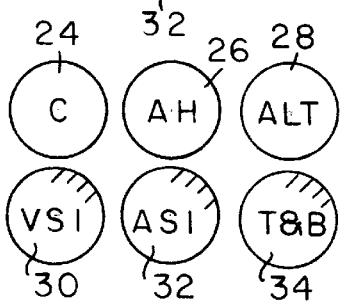
Figure 6:
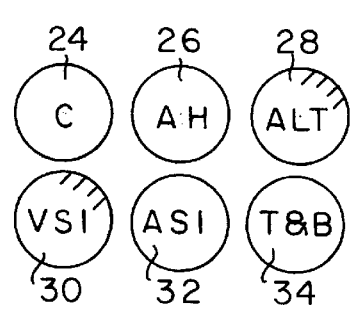
Figure 7:
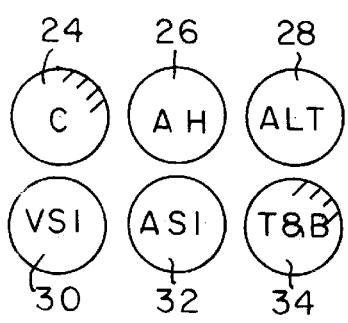

Thus, as shown, for the several flight conditions:

(1) Straight and level flight—as diagrammatically shown in FIG. 4, the first group of instruments, namely the top row provides primary aircraft information to the pilot, namely compass 24 for magnetic direction, horizon 26 for a wings level confirmation, and altimeter 28 for maintaining altitude without climb or descent. In this flight situation, the lower group of instruments provides less critical secondary information to be monitored of any tendency to climb or descend at VSI 30, the airspeed at 32, and stabilized and non-banked flight shown by the T&B 34;

(2) Simultaneous change in altitude and change of heading—as diagrammatically shown in FIG. 5, the three lower instruments provide immediate primary information to the pilot, namely a normal quick showing of rate of climb or descent on VSI 30, increase or decrease of airspeed at ASI 32 as occurs with a climb or descent, and the immediate showing of the rate of turn on the T&B 34 and that the same is stabilized with the T&B ball centered, whereby the aircraft is not skidding or slipping in the turn. The upper instruments provide secondary useful backup information in change of direction at 24, aircraft attitude relative to the horizon at 26, and reflected change in altitude at 28, and which are also monitored by the pilot;

(3) Conistant heading, changing altitude—as diagrammatically shown in FIG. 6, in this flight mode, the altimeter 28 in the upper group and diagonally opposite VSI 30 in the lower group comprise the primary indicators of direction and rate of altitude change. The symmetrical and generally diagonal positioning of these two instruments is quickly learned for instrument reference by the pilot. The remaining four instruments, two in each row, provide the necessary backup secondary information to the pilot, which would show a steady compass 24, a stabilized climb or descent at AH 26, an appropriate decrease or increase of airspeed at 32, and a centered needle and ball at 34;

(4) Constant Altitude, changing heading—as diagrammatically shown in FIG. 7, in this flight mode, the principal instruments are reversed from that of (3), wherein the gyrocompass 24 and the T&B 34 are the primary instruments showing change of compass heading and the rate of stabilized turn. As with (3) also, the symmetric, generally diagonal relationship of instruments 24 and 34 is quickly cognizant to the pilot. The remaining instruments of the first and second group provide the collateral backup information during the turn.

Accordingly, the instrument patterns for each maneuver are easily perceived and remembered by the pilot, whether in newly commencing flight training by reference to instruments, or as an experienced hand wherein prompt cross-check and scan is critical under more adverse flying conditions that may be encountered by an experienced pilot.

With this standardization of instrument placement, and these selected instruments, the pilot may quickly develop the mental patterns of a mind-set corresponding to the dynamic symmetries of the instrument layout set forth, whereby not only training but actual flight becomes easier and safer.

Some variation in the preferred grouping is possible within the scope of the invention. Thus, the VSI 30 may be switched with the T&B 34 in the bottom row, and in like manner, the compass 24 and altimeter 28 may be interchanged, or, if preferred, remain in the same positions in whichever form. In either form, it is preferred that the artificial horizon 26 and ASI 32 remain centered in each row in generally vertical relation to each other.

In FIG. 3, another variant is shown, wherein the instruments have an overall generally circular array, but, importantly, the specific and unique first row directional and second row rate relationships are maintained. Thus, the compass 24, horizon 26, and altimeter 28 are in an upper arc, and the VSI 30, ASI 32, and T&B 34 are in a lower arc. This array provides an open central space for a collateral useful instrument, namely a clock 36 with sweep second hand, thereby to permit ready timing of any flight mode without the pilot having to divert his scan away from the grouping of critical instruments.

Figure 8:
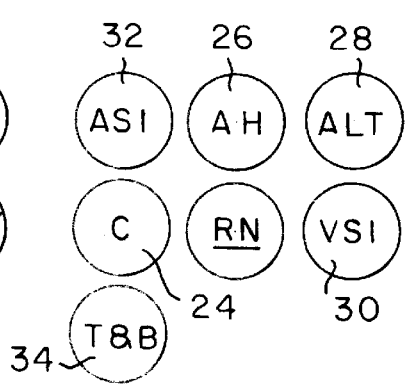
Figure 9:
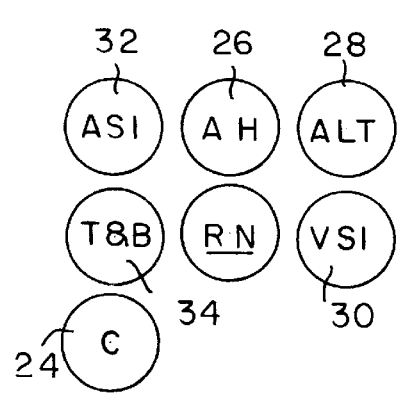

FIGS. 8 and 9 show typical randomly arranged instrument panels as currently commonly found, irrespective of the cost or complexity of the aircraft. The central instrumentation of FIG. 8, for example, typifies a new model King Air manufactured by Beech Aircraft-Raytheon, as seen in an advertisement in a current (Fall, 1999) issue of Flying magazine. The same provides an irregularity and asymmetry of array with the ASI 32, horizon 26, and altimeter 28 in the top row, while the bottom row contains, in order, a gyrocompass 24 at the far left, and the VSI 30 at the far right. In that aircraft, the space below the horizon 26 is occupied by a radio navigation instrument RN. The T&B 34 is not in the proximate grouping at all, but is located in a position below the compass 24 and away from the clustered array.

Similarly, in FIG. 9, a central panel area from an updated and modernized 1985 Beech Baron is shown wherein the top row comprises from left to right, the ASI 32, the AH 26, and altimeter 28, and the second row has the T&B 34 at the left beneath the ASI 32, and at the right below the altimeter 28 is the VSI 30. Again, a radio navigation instrument RN occupies the center below the AH 26. In this aircraft, the compass 24 is disposed in a third row below the T&B 34.

These placements, as well as those in the U.S. patents above noted, are typical of the inconsistency and asymmetric randomness of instrument placement in aircraft today, whereby instrument scans and cross-checks are neither systematized, nor symmetrical, nor logical, as to vital directional information and rate information, in contrast to the applicant's invention herein. There is no concept whatever in prior instrument panels of relating directional and rate information in a logical, quickly perceived manner as disclosed herein.

While the present disclosure employs for illustration and explanation conventional circular face analog flight instruments, it is within the concept of the invention and obvious that other and differently configured flight instruments many be employed, as digital readout instruments, or rectangular or square faced instruments, for example, all within the spirit and scope of the invention when arrayed as disclosed for the purposes contemplated.

Other objects and advantages and variants will be apparent from theforegoing, wherein the scope of the invention is to be taken from the following claims.

What I claim is:

1. An organized and symmetrical panel array of aircraft flight instruments to enhance control and safety of the aircraft under both visual (VFR) and instrument (IFR) flight conditions comprising, a first grouping of proximately positioned directional-indicating instruments, and, a second grouping of proximately positioned rate-indicating instruments, whereby related parameters of aircraft direction are quickly perceived by the grouped proximate relationship of directional-indicating instruments, and related parameters of aircraft rate are quickly perceived by the grouped proximate relationship of rate-indicating instruments in scanning the instrument panel, whereby the same may be related to each other by the pilot, and wherein, said first grouping of direction-indicating instruments includes:

a compass, an artificial horizon, and an altimeter, and, said second grouping of proximately positioned rate-indicating instruments, includes:

a vertical speed indicator, an airspeed indicator, and a turn and bank indicator.

2. The organized and symmetrical panel array of VFR/IFR instruments of claim 1 wherein said directional-indicating instruments are positioned in side-by-side relationship immediately above said rate-indicating instruments, thereby to facilitate visual scan thereof.

3. The organized and symmetrical panel array of VFR/IFR instruments of claim 1 wherein said artificial horizon of said first grouping is disposed directly above said airspeed indicator of said second grouping.

4. The organized and symmetrical panel array of VFR/IFR instruments of claim 1 wherein said altimeter of said first grouping is disposed directly above said turn and bank indicator of said second grouping.

5. The organized and symmetrical panel array of VFR/IFR instruments of claim 1 wherein said compass of said first grouping is disposed directly above said vertical speed indicator of said second grouping.

6. The organized and symmetrical panel array of VFR/IFR instruments of claim 1, wherein said artificial horizon of said first grouping is disposed directly above said air speed indicator of said second grouping, said altimeter of said first grouping is disposed directly above said turn and bank indicator of said second grouping, and, said compass of said first grouping is disposed directly above said vertical speed indicator of said second grouping.

7. The organized and symmetrical panel array of VFR/IFR instruments of claim 1 wherein said directional and rate instruments are in respective substantially straight lines with said directional instruments above said rate instruments.

8. The organized and symmetrical panel array of VFR/IFR instruments of claim 1 wherein said directional and rate instruments are in respective substantially arcuate lines with said directional instruments in an upward bow curve above said rate instruments which are disposed therebelow in a downward bow curve.

9. The organized and symmetrical panel array of VFR/IFR instruments of claim 8 further including an additional instrument in the space between said two arcuate rows.

10. The organized and symmetrical panel array of VFR/IFR instruments of claim 9 wherein said additional instrument is a clock.

11. The organized and symmetrical panel array of VFR/IFR instruments of claim 1, wherein said artificial horizon of said first grouping is disposed directly above said air speed indicator of said second grouping, said altimeter of said first grouping is disposed directly above said vertical speed indicator of said second grouping, and, said compass of said first grouping is disposed directly above said turn and bank indicator of said second grouping.

12. A method of organizing and symmetrically arranging aircraft flight instruments in a panel array to enhance control and safety of the aircraft under both visual (VFR) and instrument (IFR) flight conditions comprising the steps of:

providing a first grouping of direction-indicating instruments in generally side-by-side relation on said panel, and, providing a second grouping of rate-indicating instruments in generally adjacent relation and beneath said first grouping, and, including the further steps of providing in said first grouping of directional instruments:
a compass,
an artificial horizon, and
an altimeter, and, providing in said second grouping of rate-indicating instruments:
a vertical speed indicator,
an airspeed indicator, and
a turn and bank indicator.

whereby the proximity of both direction and rate instruments permit quick scan and related perception by the pilot.

* * * * *